United States Patent
Zhang et al.

(10) Patent No.: US 6,934,129 B1
(45) Date of Patent: *Aug. 23, 2005

(54) MAGNETORESISTIVE SENSOR WITH OVERLAPPING LEAD LAYERS INCLUDING ALPHA TANTALUM AND CONDUCTIVE LAYERS

(75) Inventors: Jinqiu Zhang, Fremont, CA (US); Jing Zhang, San Jose, CA (US); Yiming Huai, Pleasanton, CA (US); Lifan Chen, Fremont, CA (US)

(73) Assignee: Western Digital (Fremont), Inc., Fremont, CA (US)

( * ) Notice: Subject to any disclaimer, the term of this patent is extended or adjusted under 35 U.S.C. 154(b) by 135 days.

This patent is subject to a terminal disclaimer.

(21) Appl. No.: 10/260,896

(22) Filed: Sep. 30, 2002

(51) Int. Cl.⁷ ................................................ G11B 5/39
(52) U.S. Cl. ..................................................... 360/322
(58) Field of Search ........................................ 360/322

(56) References Cited

U.S. PATENT DOCUMENTS

| | | | |
|---|---|---|---|
| 5,268,806 A | 12/1993 | Goubau et al. | 360/113 |
| 5,742,459 A | 4/1998 | Shen et al. | 360/113 |
| 5,883,764 A | 3/1999 | Pinarbasi | 360/113 |
| 5,946,167 A | 8/1999 | Hara et al. | 360/113 |
| 5,978,183 A | 11/1999 | Hsiao et al. | 360/113 |
| 6,040,962 A | 3/2000 | Kanazawa et al. | 360/113 |
| 6,162,582 A | 12/2000 | Hsiao et al. | 430/312 |
| 6,163,426 A | 12/2000 | Nepela et al. | 360/66 |
| 6,219,207 B1 | 4/2001 | Pinarbasi | 360/322 |
| 6,226,158 B1 | 5/2001 | Pinarbasi | 360/322 |
| 6,344,953 B1 | 2/2002 | Kautzky et al. | 360/322 |
| 6,359,760 B2 | 3/2002 | Kanno | 360/322 |
| 6,385,016 B1 | 5/2002 | van Ek et al. | 360/322 |
| 6,538,858 B1 * | 3/2003 | Hasegawa et al. | 360/324.12 |
| 6,587,316 B2 * | 7/2003 | Hasegawa | 360/324.1 |
| 6,643,107 B1 * | 11/2003 | Hasegawa et al. | 360/322 |
| 6,663,986 B2 * | 12/2003 | Sanders | 360/322 |
| 6,731,479 B2 * | 5/2004 | Ooshima et al. | 360/324.12 |
| 2002/0024775 A1 * | 2/2002 | Hasegawa | 360/322 |
| 2002/0135947 A1 * | 9/2002 | Aoki et al. | 360/322 |
| 2002/0191353 A1 * | 12/2002 | Sato | 360/322 |
| 2003/0007295 A1 * | 1/2003 | Kamijima et al. | 360/322 |
| 2003/0189798 A1 * | 10/2003 | Lin et al. | 360/322 |
| 2004/0057163 A1 * | 3/2004 | Lin | 360/322 |

* cited by examiner

Primary Examiner—Craig A. Renner
(74) Attorney, Agent, or Firm—Joshua Harrison, Esq.; Silicon Edge Law Group

(57) ABSTRACT

Magnetoresistive (MR) sensors are disclosed that have leads that overlap a MR structure and distribute current to and from the MR structure so that the current is not concentrated in small portions of the leads, alleviating the problems mentioned above. For example, the leads can be formed of a body-centered cubic (bcc) form of tantalum, combined with gold or other highly conductive materials. For the situation in which a thicker bcc tantalum layer covers a highly conductive gold layer, the tantalum layer protects the gold layer during MR structure etching, so that the leads can have broad layers of electrically conductive material for connection to MR structures. The broad leads also conduct heat better than the read gap material that they replace, further reducing the temperature at the connection between the leads and the MR structure.

21 Claims, 3 Drawing Sheets

MAGNETORESISTIVE SENSOR WITH OVERLAPPING LEAD LAYERS INCLUDING ALPHA TANTALUM AND CONDUCTIVE LAYERS

BACKGROUND

The present invention relates to magnetoresistive (MR) sensing mechanisms, which may for example be employed in information storage systems or measurement and testing systems.

FIG. 1 shows a media-facing view of a prior art magnetoresistive (MR) sensor 20 that may for example be used in a head of a disk drive. A MR structure 22 is formed from one or more layers so that the structure 22 has a resistance that varies in resistance in response to an applied magnetic field. Lead layers 25 have been formed that carry current through the MR structure 22 to gauge the change in resistance and thereby sense the magnetic field. Bias layers 27 abut the structure to stabilize magnetic domains at the edges of the MR structure 22 and reduce noise in the sensor 100. A pair of magnetically soft layers 30 and 33 shield the MR structure 22 from magnetic fields that are not opposite the MR structure 22 in the media, the shields 30 and 33 isolated from the MR structure 22, leads 25 and bias layers 27 by first and second dielectric read layers 35 and 38.

The lead layers 25 may be made of gold that has been formed atop a tantalum seed layer and capped with another thin tantalum layer. The lead layers 25 overlap the MR structure 22 to contact the MR structure 22 at sharp points 40 and 42. Because the lead layers 25 overlap the MR structure 22, the effective sensing width of the sensor 20 is less than the width of the MR structure 22. The effective sensing width is sometimes called the track-width of the sensor 20. The electric current that flows through the MR structure 22 primarily flows through points 40 and 42, which can cause excessive heating at those points, reducing the sensitivity of the sensor and leading to other problems such as electromigration and damage to the sensor.

SUMMARY

Magnetoresistive (MR) sensors are disclosed that have leads that overlap a MR structure and distribute current to and from the MR structure so that the current is not concentrated in small portions of the leads, alleviating the problems mentioned above. For example, the leads can be formed of a body-centered cubic (bcc) form of tantalum, combined with gold or other highly conductive materials. For the situation in which a thicker bcc tantalum layer covers a highly conductive gold layer, the tantalum layer protects the gold layer during MR structure etching, so that the leads can have broad layers of electrically conductive material for connection to MR structures. The broad leads also conduct heat better than the read gap material that they replace, further reducing the temperature at the connection between the leads and the MR structure.

DETAILED DESCRIPTION OF THE PREFERRED EMBODIMENTS

Figure 2:
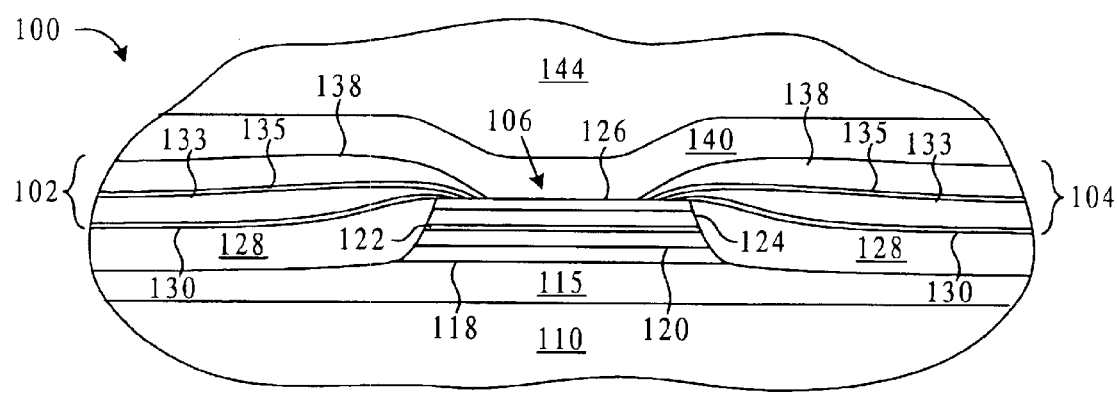
FIG. 2 is a cut-away view of a media-facing surface of a MR sensor in accordance with the present invention.

FIG. 2 shows a view of a media-facing surface of a MR sensor 100 that has leads 102 and 104 that overlap an MR structure 106 and distribute current to the MR structure 106. The media-facing surface may be coated with a thin layer of hard dielectric material such as diamond-like carbon (DLC) that is transparent and so not shown in FIG. 2. The MR sensor 100 has been formed on a wafer substrate along with thousands of similar sensors and optional inductive recording transducers, not shown, before the wafer was diced into individual units, polished and coated to form the media-facing surface shown. Atop the substrate a first magnetically soft shield layer 110 has been formed, after which a first dielectric read gap layer 115 was deposited and polished.

The MR structure 106 was then deposited in a series of layers atop the first read gap layer 115, beginning with a pinning layer 118 or layers including antiferromagnetic (AF) material for pinning a magnetic moment of a first ferromagnetic layer 120, also known as a pinned layer 120. A nonferromagnetic spacer layer 122 was then formed, for example of copper or gold, followed by a second ferromagnetic layer 124, also known as a free layer 124. A capping layer 126 was then formed, for example of tantalum, after which the sensor layers were masked and etched to define MR structure 106.

Bias layers 128 were then formed for example of AF or high coercivity ferromagnetic material, and the mask covering structure 106 removed, lifting off bias material that had been deposited atop the mask. Another mask was then formed that partly covered the MR structure 106, so that leads 102 and 104 could be formed on opposite sides of the mask. An adhesion layer 130 of tantalum or chromium was formed to a thickness of between about 10 Å and 200 Å, followed by a conductive layer 133 made of materials having a resistivity of less than $6 \times 10^{-8}$ Ωm at 25° C., such as gold, silver, copper, aluminum, beryllium, rhodium or tungsten. The adhesion layer can also be made of a layer of chromium followed by a layer of tantalum, so that the tantalum has an alpha tantalum phase, as described below. The conductive layer 133 has a thickness in a range between about 100 Å and 800 Å in this example.

A bcc seed layer 135 having a lattice constant substantially matching that of tantalum, such as chromium, tungsten, tantalum-tungsten or titanium-tungsten, was then formed to a thickness between about 20 Å and 100 Å, upon which a conductive tantalum layer 138 was formed. The seed layer 135 promotes growth of the bcc phase of tantalum, also known as alpha tantalum ($\alpha$-Ta). For the case in which the conductive layer 133 is made of tungsten, an additional seed layer may not be necessary to form $\alpha$-Ta. Although not as easy to fabricate as beta tantalum ($\beta$-Ta), which has a tetragonal crystalline structure, $\alpha$-Ta is a significantly better electrical and heat conductor than $\beta$-Ta. The current in leads 102 and 104 is thus spread between gold layer 133, chromium layer 135 and alpha tantalum layer 138, reducing current crowding.

Moreover, alpha tantalum is much harder than gold, so that less of leads 102 and 104 may be removed during a subsequent etching step that determines the height of the MR structure 106 from the media-facing surface, as explained below, further reducing current crowding and lowering lead resistance. After the MR structure 106 height was defined, a second dielectric read gap layer 140 was deposited, on top of which a second magnetically soft shield layer 144 was formed. Although not shown in this figure, an inductive transducer may be formed prior to or subsequent to the MR sensor 100, for example to create a head that writes and reads information on a storage medium.

Figure 3:
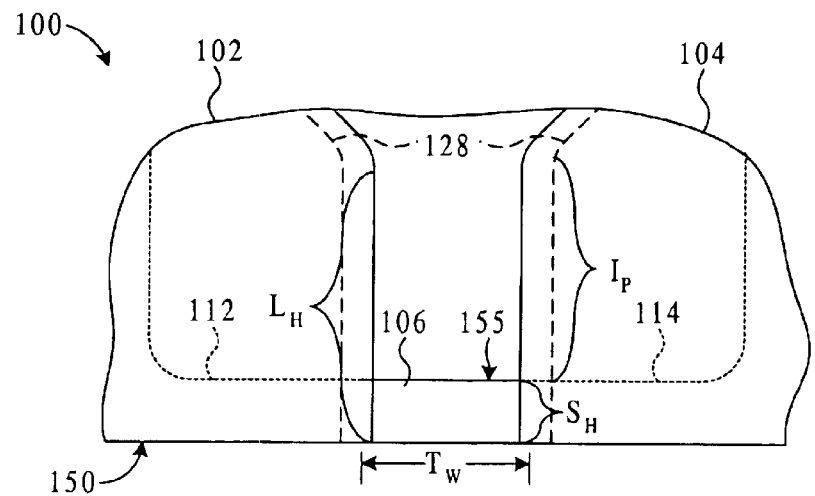
FIG. 3 is a cut-away opened up view of the sensor of FIG. 2.

FIG. 3 is an opened up view of the sensor 100 of FIG. 2, which illustrates an advantage mentioned above. The media-facing surface 150 is evident in this view, as are MR structure 106 and leads 102 and 104. Bias layers 128 are covered by the leads 102 and 104, which partially overlap MR structure 106. MR structure 106 has been masked and etched, for example by ion beam etching (IBE), to create a back edge 155 that defines an active height or stripe height SH of the structure 106 from the media-facing surface 150. An inactive portion $I_P$ of the structure 106 extends further from the media-facing surface 150, and is covered by active portions of leads 102 and 104. The leads 102 and 104 have been partially etched during the creation of edge 155, as shown by dotted lines 112 and 114, respectively. The hard alpha tantalum layers 138 protect the softer conductive layers 133 during etching so that part of the alpha tantalum layers 138 and all of the gold layers 133 remain intact.

Figure 1:
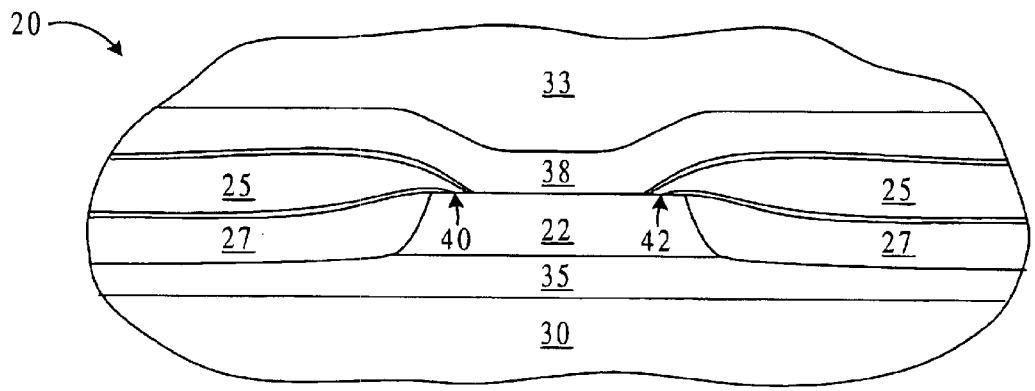
FIG. 1 is a cut-away view of a media-facing surface of a prior art MR sensor.

In contrast, during the creation of a back edge for the prior art MR structure 22 shown in FIG. 1, the soft gold leads 25 would have been fully removed at areas such as those bounded by dotted lines 112 and 114, exposing bias layers 27 and leaving only thin leads connected to the MR structure 22. The thicker alpha tantalum layers 138 shown in FIG. 3 have not been completely removed above lines 102 and 104, so that the lead height $L_H$ for this embodiment is substantially greater than the MR stripe height $S_H$. The conductive layer 133 covered by the alpha tantalum layers 138 also remains intact in this case, even for the case in which that layer 133 is made of soft materials such as gold or copper. This greater lead height $L_H$ decreases the electrical resistance of the leads 102 and 104 and increases the thermal conductivity of the material directly adjoining the contact between the leads 102 and 104 and the MR structure 106. A track width $T_W$ of the sensor 100 is slightly less than the spacing between leads 102 and 104, due to the broadened contacts of those leads with the MR structure 106.

Figure 4:
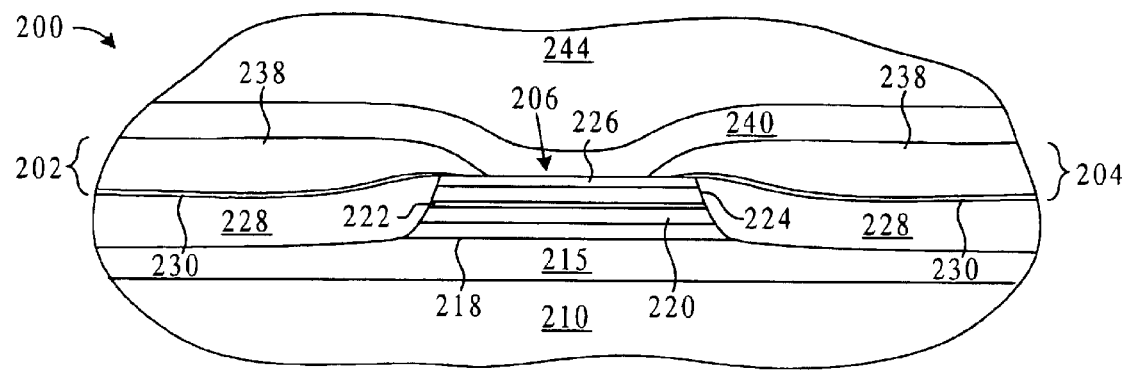
FIG. 4 is a cut-away view of a media-facing surface of another embodiment of a MR sensor.

FIG. 4 shows another embodiment of a MR sensor 200 that has leads 202 and 204 containing alpha tantalum that overlap and distribute current to an MR structure 206. In this embodiment, leads 202 and 204 include a layer 238 of alpha tantalum formed on a bcc seed layer 230 such as Cr, W, TaW or TiW that promotes the formation of alpha tantalum, although leads 202 and 204 could instead be formed of a multilayer structure described above or below. Similar to the embodiment described above, MR sensor 200 has first and second magnetically soft shield layers 210 and 244, first and second dielectric read gap layers 215 and 240, a pinning layer 218 or layers, a pinned ferromagnetic layer 220, a nonferromagnetic spacer layer 222, a free ferromagnetic layer 224 and bias layers 228. Note that in this embodiment as well as other embodiments the ordering of pinning, pinned and free layers may be reversed. Also note that various other magnetoresistive structures may be used, such as multilayer giant magnetoresistive (GMR) structures. A capping layer 226 is disposed atop MR structure 206, the capping layer 226 formed for example of tantalum.

The alpha tantalum lead layers 238 have resistivity that is four to five times greater than that of gold but almost an order of magnitude less than that of beta tantalum. Although the higher resistivity should result in greater ohmic heating and therefore exacerbated electromigration, the alpha tantalum leads 138 have reduced electromigration compared to the prior art sensor of FIG. 1. The reduced electromigration may result from a greater distribution of current in the layers 238, and as discussed with reference to FIG. 3, the track width of the sensor may be greater than the separation between lead layers 238.

Figure 5:
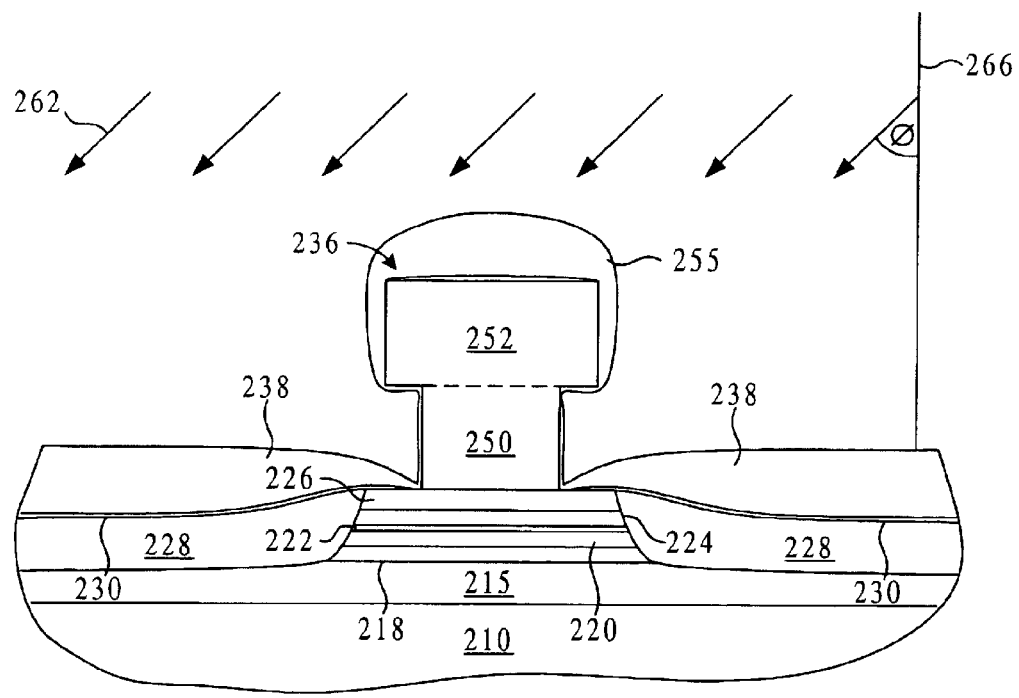
FIG. 5 is a cut-away cross-sectional view of a step in the formation of the MR sensor of FIG. 4.

FIG. 5 is a cross-sectional view of a step in the formation of the transducer 200 of FIG. 4. In FIG. 5, a bi-layer mask 236 has been formed of PMGI 250 and photoresist 252, the mask partly covering beta tantalum capping layer 226. Bcc seed layers 230 and alpha tantalum lead layers 238 have been deposited on bias layers 228 and also on and around the mask 236. The overhanging photoresist 252 allows undercut PMGI layer 250 to remain exposed, provided that the lead layers 238 are not deposited too thickly, allowing the mask to be chemically dissolved and the metal atop the mask to be lifted off. For the situation depicted in FIG. 5, however, metal leads 238 and seed layer 230 have completely enveloped mask 236. In this case a metal cap 255 covering mask 236 can be removed by breaking the cap off during washing with the resist solvent, for example by agitating the solvent and/or the wafer.

The seed layers 230 and lead layers 238 have been formed by ion beam deposition (IBD), as depicted with arrows 262 indicating a direction at which atoms are sputtered toward substrate 210. For example, sputtering may be directed at an angle θ to perpendicular 266 to the wafer surface, angle θ also being known as the deposition angle. The angle θ can be changed by adjusting the fixture holding the substrate. It has been discovered that depositing the seed layer 230 at a large angle θ and depositing the lead layer 238 at a small angle θ is preferable for formation of alpha tantalum with minimal seed thickness. For example, the angle θ for seed layer 230 deposition may be about 20° or more, and the angle θ for lead layer 238 deposition may be about 10° or less.

Figure 6:
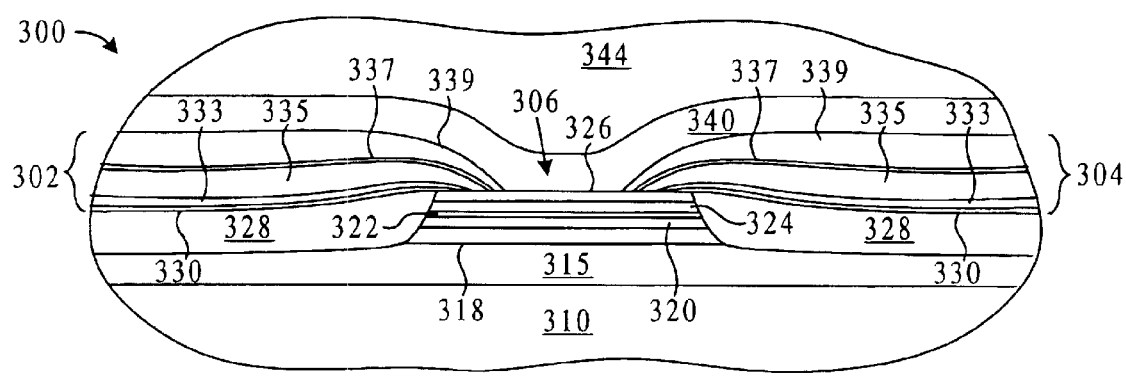
FIG. 6 is a cut-away view of a media-facing surface of another embodiment of a MR sensor.

FIG. 6 is a cross-sectional view of another embodiment in accordance with the present invention. In this embodiment MR sensor 300 has leads 302 and 304 each containing plural layers of alpha tantalum that overlap and distribute current to an MR structure 306. Similar to the embodiments described above, MR sensor 300 has first and second magnetically soft shield layers 310 and 344, first and second dielectric read gap layers 315 and 340, a pinning layer 318 or layers, a pinned ferromagnetic layer 320, a nonferromagnetic spacer layer 322, a free ferromagnetic layer 324 and bias layers 328. A capping layer 326 is disposed atop MR structure 306, the capping layer 326 formed for example of tantalum.

A layer 333 of alpha tantalum is formed on a bcc seed layer 330 such as Cr, W, TaW or TiW that promotes the formation of alpha tantalum. The seed layer 330 should have sufficient thickness, for example at least about 20 Å, so that the lattice-matched bcc crystalline structure of the seed layer is adopted by the tantalum layer 333. The alpha tantalum layer 333 can have various thicknesses, ranging for example from less than 40 Å to greater than 200 Å. A highly conductive layer 335 is then formed, for example of gold, silver, copper, aluminum, beryllium, rhodium or tungsten, that has a resistivity of less than $6\times10^{-8}$ Ωm at 25° C. A bcc seed layer 337 such as Cr, W, TaW or TiW is then formed to a thickness of at least about 20 Å, upon which an alpha tantalum layer 339 is formed. This layer may have a thickness calculated to withstand trimming of the MR structure 306, protecting the highly conductive layer 335. This also protects the MR structure 306 in the area overlapped by leads 302 and 304, so that the MR structure 306 is shaped like a letter U, similar to the depiction in FIG. 3, but despite this unusual shape the sensor 300 functions well. Having the highly conductive layers 335 extend beyond the stripe height of the structure reduces lead resistivity and increases heat dissipation, both improving electromigration.

Figure 7:
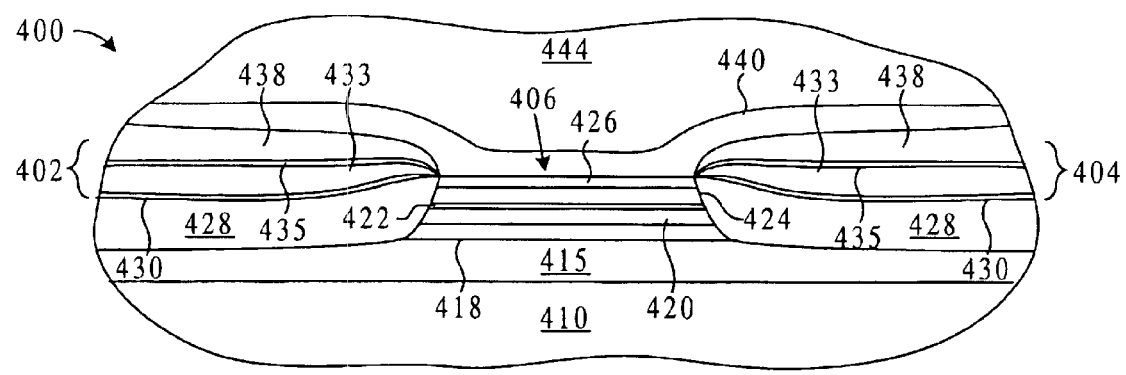
FIG. 7 is a cut-away view of a media-facing surface of another embodiment of a MR sensor.

FIG. 7 shows another embodiment of a MR sensor 400 that has leads 402 and 404 containing alpha tantalum that distribute current to an MR structure 406. In this embodiment, however, leads 402 and 404 abut the MR sensor 406 in a design that may be known as a contiguous junction. Leads 402 and 404 include a layer 438 of alpha tantalum formed on a bcc seed layer 435 such as Cr, W, TaW or TiW that promotes the formation of alpha tantalum. Gold, copper or other highly conductive materials may form layer 433, deposited atop a seed layer 430 such as Cr or Ta. Instead of a multistep process used to form overlapping leads, lead layers and hard bias layers 428 are deposited using a single mask. The stripe height, however, may defined by the same process as described above with reference to FIG. 3. Due to the slow etch rate of Ta on top of Au or Cu layer 433, the more electrically conductive Au or Cu is preserved during stripe height milling. The extended electrically conductive layer 433 offers the advantage of reduced device-level parasitic resistance and provides a more effective heat dissipation path to improve device reliability. Similar to embodiments described above, MR sensor 400 has first and second magnetically soft shield layers 410 and 444, first and second dielectric read gap layers 415 and 440, a pinning layer 418 or layers, a pinned ferromagnetic layer 420, a nonferromagnetic spacer layer 422, and a free ferromagnetic layer 424. A capping layer 426 is disposed atop MR structure 406, the capping layer 426 formed for example of tantalum.

Although the present disclosure has focused on teaching the preferred embodiments, other embodiments and modifications of this invention will be apparent to persons of ordinary skill in the art in view of these teachings. For example, the sensing device may be part of a magnetic head that includes a write element that may be previously or subsequently formed. Alternatively, the sensing device may be used for measuring or testing for magnetic fields. Therefore, this invention is to be limited only by the following claims, which include all such embodiments and modifications when viewed in conjunction with the above specification and accompanying drawings.

What is claimed is:

1. A device comprising:
   a magnetoresistive structure including a first ferromagnetic layer separated from a second ferromagnetic layer by an electrically conductive, nonmagnetic spacer layer, said first ferromagnetic layer having a magnetization direction that is substantially fixed in the presence of an applied magnetic field, said second ferromagnetic layer having a magnetization direction that varies in response to said applied magnetic field, said magnetoresistive structure having a first edge and a second edge that are separated in a track-width direction by a first distance;
   a first bias layer adjoining said first edge and a second bias layer adjoining said second edge; and
   a first lead layer disposed adjacent to said first bias layer and overlapping said first edge, and a second lead layer disposed adjacent to said second bias layer and overlapping said second edge, said first and second lead layers separated from each other in said track-width direction by a second distance that is less than said first distance, said first and second lead layers including first and second conductive layers, respectively, said conductive layers having a resistivity less than $6\times10^{-8}$ $\Omega$m at 25° C., with first and second metal seed layers adjoining said first and second conductive layers, respectively, said first and second seed layers having a body-centered cubic crystalline structure, and first and second tantalum layers adjoining said first and second seed layers, respectively, said first and second tantalum layers having a body-centered cubic crystalline structure.

2. The device of claim 1, wherein said device has a media-facing surface, and said magnetoresistive structure has an active area that is disposed adjacent to said media-facing surface and an inactive area that is disposed distal said media-facing surface.

3. The device of claim 1, wherein said device has a media-facing surface and said magnetoresistive structure has an active area that is disposed adjacent to said media-facing surface, and said first and second conductive layers overlap said magnetoresistive structure in areas that extend further than said active area from said media-facing surface.

4. The device of claim 1, wherein said first and second lead layers include third and fourth seed layers having a body-centered cubic crystalline structure, and third and fourth tantalum layers adjoining said third and fourth seed layers, respectively, said third and fourth tantalum layers having a body-centered cubic crystalline structure.

5. The device of claim 1, wherein said first and second seed layers are made of a material from the group consisting essentially of Cr, W, TaW and TiW.

6. The device of claim 1, wherein said first and second lead layers each include a layer of chromium having a thickness that is greater than 20 Å.

7. The device of claim 1, wherein said first and second conductive layers each include gold.

8. A device comprising:
   a magnetoresistive structure disposed adjacent to a media-facing surface, said magnetoresistive structure including a first ferromagnetic layer separated from a second ferromagnetic layer by an electrically conductive, nonmagnetic spacer layer, said first ferromagnetic layer having a magnetization direction that is substantially fixed in the presence of an applied magnetic field, said second ferromagnetic layer having a magnetization direction that varies in response to said applied magnetic field, said magnetoresistive structure extending along said media-facing surface between a first edge and a second edge, and having an active portion that extends a first distance from said media-facing surface;
   a first bias layer adjoining said first edge;
   a second bias layer adjoining said second edge;
   a first conductive layer disposed adjacent to said first bias layer and overlapping a top of said magnetoresistive structure in a first region, said first conductive layer having a resistivity less than $6\times10^{-8}$ $\Omega$m at 25° C.; and
   a second conductive layer disposed adjacent to said second bias layer and overlapping the top of said magnetoresistive structure in a second region, said second conductive layer having a resistivity less than $6\times10^{-8}$ $\Omega$m at 25° C.;
   wherein said first and second regions extend further than said first distance from said media-facing surface.

9. The device of claim 8, wherein said first conductive layer is disposed adjacent to a tantalum layer having a body-centered cubic crystalline structure.

10. The device of claim 8, wherein said first conductive layer is disposed between two tantalum layers, at least one of which has a body-centered cubic crystalline structure.

11. The device of claim 8, wherein said first and second conductive layers are separated from each other by a smaller distance than that between said first and second edges.

12. The device of claim 8, wherein said magnetoresistive structure includes a U-shaped section adjacent to said media-facing surface.

13. The device of claim 8, wherein said first conductive layer adjoins an ion beam deposited layer.

14. The device of claim 8, wherein a portion of said first conductive layer that is disposed in said first region adjoins a dielectric read gap.

15. A device comprising:

a magnetoresistive structure disposed adjacent to a media-facing surface and including a first ferromagnetic layer separated from a second ferromagnetic layer by an electrically conductive, nonmagnetic spacer layer, said first ferromagnetic layer having a magnetization direction that is substantially fixed in the presence of an applied magnetic field, said second ferromagnetic layer having a magnetization direction that varies in response to said applied magnetic field, said magnetoresistive structure having a first edge and a second edge that are separated by a first distance in a track-width direction;

a first bias layer adjoining said first edge and a second bias layer adjoining said second edge; and a first lead layer disposed adjacent to said first bias layer and extending beyond said first edge to overlap said magnetoresistive structure in a first region, and a second lead layer disposed adjacent to said second bias layer and extending beyond said second edge to overlap said magnetoresistive structure in a second region, said first and second regions separated from each other in said track-width direction by a second distance that is less than said first distance, said first and second regions extending further than an active portion of said magnetoresistive structure from said media-facing surface, said first and second lead layers including first and second electrically conductive layers, respectively, each of said electrically conductive layers having a resistivity that is less than $6 \times 10^{-8}$ $\Omega$m at 25° C.

16. The device of claim 15, wherein said first and second lead layers include first and second tantalum layers, respectively, said first and second tantalum layers having a body-centered cubic crystalline structure.

17. The device of claim 15, wherein said first lead layer includes first and second tantalum layers, respectively, said first and second tantalum layers having a body-centered cubic crystalline structure.

18. The device of claim 15, wherein said magnetoresistive structure has a U-shaped section including an active stripe disposed between and adjoining two inactive projections.

19. The device of claim 15, wherein said first conductive layer adjoins an ion beam deposited layer.

20. The device of claim 15, wherein a surface of said first conductive layer that is disposed in said first region distal to said magnetoresistive structure adjoins a dielectric read gap.

21. The device of claim 15, wherein said first and second lead layers include a gold layer and an alpha tantalum layer.

* * * * *